(12) United States Patent
Zhang et al.

(10) Patent No.: US 11,569,954 B2
(45) Date of Patent: Jan. 31, 2023

(54) DEMODULATION REFERENCE SIGNAL AND PHASE-TRACKING REFERENCE SIGNAL PORT INDICATION

(71) Applicant: Apple Inc., Cupertino, CA (US)

(72) Inventors: Yushu Zhang, Beijing (CN); Alexei Davydov, Nizhny Novgorod NIZ (RU); Gang Xiong, Portland, OR (US); Guolong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/440,209

(22) Filed: Jun. 13, 2019

(65) Prior Publication Data

US 2019/0296876 A1 Sep. 26, 2019

Related U.S. Application Data

(60) Provisional application No. 62/685,152, filed on Jun. 14, 2018.

(51) Int. Cl.
*H04L 5/00* (2006.01)
(52) U.S. Cl.
CPC .................... *H04L 5/0048* (2013.01)
(58) Field of Classification Search
CPC ..... H04B 7/0626; H04B 7/0456; H04J 13/00; H04L 27/261; H04L 27/2613
See application file for complete search history.

(56) References Cited

U.S. PATENT DOCUMENTS

| | | | |
|---|---|---|---|
| 2013/0021991 A1* | 1/2013 | Ko | H04W 72/048 370/329 |
| 2013/0265955 A1* | 10/2013 | Kim | H04W 72/02 370/329 |
| 2019/0215118 A1* | 7/2019 | Moles | H04W 72/0453 |
| 2019/0246395 A1* | 8/2019 | Huang | H04W 72/0446 |
| 2019/0379431 A1* | 12/2019 | Park | H04W 72/04 |
| 2020/0015200 A1* | 1/2020 | Vilaipornsawai | H04L 1/1819 |
| 2020/0099461 A1* | 3/2020 | Chen | H04L 1/00 |
| 2020/0178287 A1* | 6/2020 | Kim | H04L 5/001 |
| 2020/0395988 A1* | 12/2020 | Lee | H04B 7/0626 |
| 2021/0235452 A1* | 7/2021 | Huang | H04L 5/0094 |

FOREIGN PATENT DOCUMENTS

CN 201810580903.X * 6/2018 ............ H04W 72/04

OTHER PUBLICATIONS

3GPP, "Technical Specification Group Radio Access Network; NR; Multiplexing and channel coding (Release 15)," 3GPP TS 38.212 V15.1.1 (Apr. 2018), 5G, 94 pages.
3GPP, "Technical Specification Group Radio Access Network; NR; Physical layer procedures for data (Release 15)," 3GPP TS 38.214 V15.1.0 (Mar. 2018), 5G, 77 pages.

* cited by examiner

*Primary Examiner* — Ayaz R Sheikh
*Assistant Examiner* — Debebe A Asefa
(74) *Attorney, Agent, or Firm* — Sterne, Kessler, Goldstein & Fox P.L.L.C.

(57) ABSTRACT

Embodiments of the present disclosure provide for indications of demodulation reference signal port groups and phase-tracking reference signal port indications. Other embodiments may be described and claimed.

24 Claims, 10 Drawing Sheets

DEMODULATION REFERENCE SIGNAL AND PHASE-TRACKING REFERENCE SIGNAL PORT INDICATION

CROSS REFERENCE TO RELATED APPLICATION

The present application claims priority to U.S. Provisional Patent Application No. 62/685,152, filed Jun. 14, 2018, and entitled "Demodulation Reference Signal (DMRS) and Phase Tracking Reference Signal (PT-RS) Port Indication." The disclosure of this provisional application is hereby incorporated by reference in its entirety.

FIELD

Embodiments of the present invention relate generally to the technical field of wireless communications.

BACKGROUND

Downlink single Transmission Reception Point (TRP) and single panel operation has been specified. In the future, the scenario may be extended to support more than one TRP or panels. Operation in such scenarios may need to be addressed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
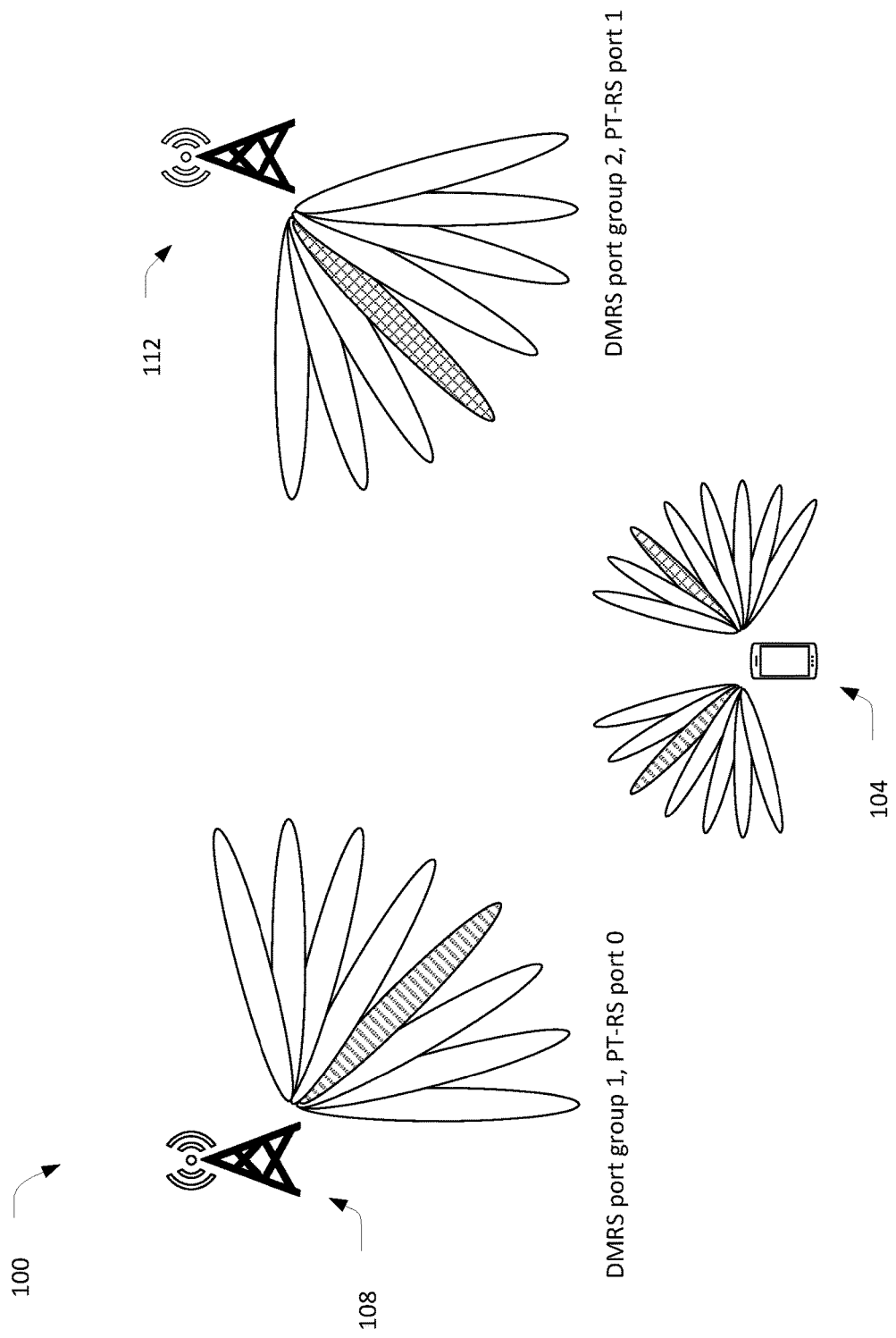
FIG. 1 illustrates a network in accordance with some embodiments.

FIG. 1 illustrates a network 100 in accordance with some embodiments. In general, the components shown in network 100 may be similar to, and substantially interchangeable with, like-named components in other figures described herein. The network 100 may include a user equipment (UE) 104, transmission/reception point (TRP) 108, and TRP 112 the communicate with one another consistent with 5th Generation/New Radio (5G/NR) specifications of the Third Generation Partnership Project (3GPP). The UE 104 may be part of, or associated with, UEs 501 or 502 described in FIG. 5; and TRPs 108 and 112 may be part of, or associated with, access nodes such as RAN nodes described in FIG. 5. The TRPs 108 and 112 may also be referred to as "gNodeBs" or "gNBs." TRP and gNB may be used interchangeably herein.

The TRPs 108/112 may transmit demodulation reference signals (DMRS) to facilitate demodulation of downlink physical channels. In some embodiments, DMRSs be provided for a physical downlink shared channel (PDSCH), a physical downlink control channel (PDCCH), and a physical broadcast channel (PBCH), which may enable the UE 104 to demodulate the respective channels.

The TRPs 108/112 may also transmit phase tracking reference signals (PT-RS) that may be used by the UE 104 to track a phase of the PDSCH.

The DMRS and PT-RS may be transmitted over various antenna ports (or simply "ports"). 3GPP Technical Specification (TS) 38.211 v15.1.0 (2018-03) states that an "antenna port is defined such that the channel over which a symbol on the antenna port is conveyed can be inferred from the channel over which another symbol on the same antenna port is conveyed." Thus, reference signals such as DMRS/PT-RS may facilitate demodulation/phase tracking for signals transmitted on physical channels of similar antenna ports.

The network 100 may illustrate multi-TRP and multi-panel operation, where more than one DMRS port groups and more than one PT-RS ports may be can be available for a UE 104 to demodulate downlink signals from TRPs 108 and 112 as shown in FIG. 1. As used herein, "multi" means "more than one."

Embodiments describe how to indicate the DMRS port groups as well as number of PT-RS antenna ports (APs). In particular, this disclosure provides ways to indicate DMRS and PT-RS ports to support downlink multi-TRP and multi-panel operation including: DMRS port group indication; and PT-RS port and PT-RS to DMRS port association indication.

To support multi-panel and multi-TRP operation, up to N DMRS port groups and PT-RS ports may be supported, for example, N=2. In an embodiment, the UE 104 may report the number of DMRS port groups and PT-RS ports it can support as a UE capability. In some embodiments, UE capability information may be requested/provided by radio resource control (RRC) signaling. For example, the network (e.g., TRP 108 or 112) may send the UE 104 a UE capability inquiry message to request the capability information. The UE 104 may then respond with a UE capability information message to report the requested information, including the number of supported DMRS port groups and PT-RS ports.

In various embodiments, the multi-TRP and multi-panel operation may be based on a single Downlink Control Information (DCI) or Multiple DCIs (N DCIs). The control signaling to indicate the PT-RS and DMRS port for single DCI and multi-DCI could be different. In another embodiment, whether a single DCI or multiple DCI can be used to schedule PDSCH in one transmission duration could be configured by higher layer signaling and/or be based on a UE capability. Some embodiments below are described for the various operation modes.

Single DCI Based Multi-TRP and Multi-Panel Based Operation

In this mode, a single DCI can be used to schedule the PDSCH transmission from one or multiple gNBs.

In an embodiment, in a Transmission Configuration Indication (TCI) state, more than one reference signal with the same quasi-co-location (QCL) type can be configured. In one example, up to two reference signals can be configured with "QCL-typeD," which may indicate that the reference signals share a spatial receive (Rx) parameter. Then the TCI state can be defined as shown in Table 1.

TABLE 1

TCI State Configuration

```
TCI-State ::=         SEQUENCE {
    tci-StateId           TCI-StateId,
    qcl-Type1             QCL-Info,
    qcl-Type2             QCL-Info,           OPTIONAL,    -- Need R
    qcl1-Type1            QCL-Info,           OPTIONAL,    -- Need R
    qcl1-Type2            QCL-Info,           OPTIONAL,    -- Need R
    ...
}
QCL-Info ::=          SEQUENCE {
    cell                  ServCellIndex       OPTIONAL,    -- Need R
    bwp-Id                BWP-Id              OPTIONAL, -- Cond CSI-RS-Indicated
    referenceSignal       CHOICE {
        csi-rs                NZP-CSI-RS-ResourceId,
        ssb                   SSB-Index
    },
    qcl-Type              ENUMERATED {typeA, typeB, typeC, typeD},
    ...
```

In another example, the TCI state can be defined as shown in Table 2.

TABLE 2

TCI State Configuration

```
TCI-State ::=         SEQUENCE {
    tci-StateId           TCI-StateId,
    qcl-Type1             QCL-Info,
    qcl-Type2             QCL-Info,           OPTIONAL,    -- Need R
    ...
}
QCL-Info ::=          SEQUENCE {
    cell                  ServCellIndex       OPTIONAL,    -- Need R
    bwp-Id                BWP-Id              OPTIONAL, -- Cond CSI-RS-Indicated
    referenceSignal       CHOICE {
        csi-rs                NZP-CSI-RS-ResourceId,
        ssb                   SSB-Index
    },
    referenceSignal1      CHOICE {
        csi-rs                NZP-CSI-RS-ResourceId,
        ssb                   SSB-Index
    },                                        OPTIONAL,    -- Need R
    qcl-Type              ENUMERATED {typeA, typeB, typeC, typeD},
    ...
}
```

In some embodiments, the number of DMRS port groups for a PDSCH transmission can be determined by the number of reference signals for a QCL type in corresponding TCI state for a current PDSCH transmission. In one option, the UE 104 may expect the number of reference signals for all the QCL types configured in a TCI state to be equal. In another option, the UE 104 may determine the number of DMRS port groups based on the number of reference signals for a particular QCL type, e.g. QCL-typeD.

Then the DMRS port index indication based on the field Antenna Port(s) can be based on multiple tables, where a subset of tables can be used for the DMRS port index indication for a particular number of DMRS port groups. Further, the DMRS port index in different DMRS port groups should be within different DMRS code-division multiplexing (CDM) groups.

Tables 3 and 4 illustrate examples for the DMRS port index indication for different number of DMRS port groups when DMRS type 1 and 1 symbol DMRS is used.

TABLE 3

An Example for indication of Antenna port(s) (1000 + DMRS port), dmrs-Type = 1, maxLength = 1 when number of DMRS port group = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 4

An Example for indication of Antenna port(s) (1000 + DMRS port), dmrs-Type = 1, maxLength = 1 when number of DMRS port group = 2
One Codeword:
Codeword 0 enabled,
Codeword 1 disabled

| Value | Number of DMRS CDM group(s) without data | DMRS port(s) in DMRS port group 1 | DMRS port(s) in DMRS port group 2 |
|---|---|---|---|
| 0 | 2 | 0 | 2 |
| 1 | 2 | 0 | 3 |
| 2 | 2 | 1 | 2 |
| 3 | 2 | 1 | 3 |
| 4 | 2 | 0, 1 | 2 |
| 5 | 2 | 0, 1 | 3 |
| 6 | 2 | 0 | 2, 3 |
| 7 | 2 | 1 | 2, 3 |
| 8 | 2 | 0, 1 | 2, 3 |
| 9-15 | Reserved | Reserved | Reserved |

Figure 2:
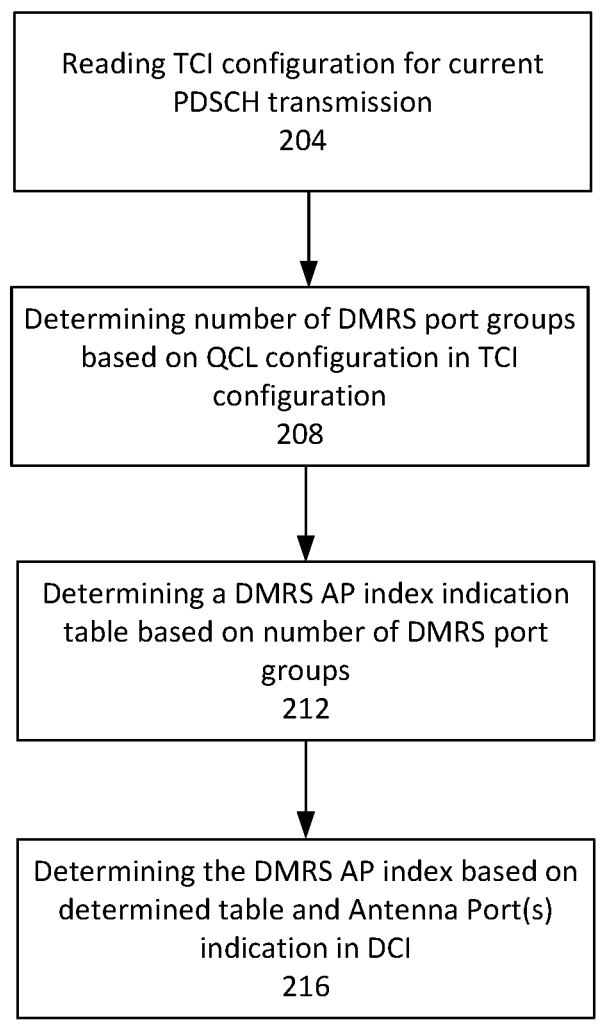
FIG. 2 illustrates an operation flow/algorithmic structure in accordance with some embodiments.

FIG. 2 illustrates in operation flow/algorithmic structure 200 to identify DMRS antenna ports in accordance with some embodiments. The operation flow/algorithmic structure 200 may be performed by the UE 104 or components thereof, for example, baseband circuitry of the UE 104 (see, for example, baseband circuitry 610 of FIG. 6).

At 204, the operation flow/algorithmic structure 200 may include reading a TCI configuration for a current PDSCH transmission. The TCI configuration may be communicated to the UE 104 in configuration information transmitted by a gNB, for example, TRP 108 or 112.

At 208, the operation flow/algorithmic structure 200 may include determining a number of DMRS port groups based on a QCL configuration in the TCI configuration. For example, the UE 104 may determine that a number of DMRS port groups is equal to a number of reference signals for a particular QCL type, for example QCL typeD.

At 212, the operation flow/algorithmic structure 200 may include determining a DMRS AP index indication table based on a number of DMRS port groups. For example, the UE 104 may be configured with two tables, one of which may be used if the number of DMRS port groups is equal to one (for example, Table 3 shown above), and the other may be used if the number of DMRS port groups is equal to two (for example, Table 4 shown above).

At 216, the operation flow/algorithmic structure 200 may further include determining a DMRS AP index based on the determined table and an indication in an Antenna port(s) field in in DCI. The DCI may be transmitted by a gNB to schedule the PDSCH transmission.

In some embodiments, the number of DMRS port groups can be indicated by DCI, which can be based on an independent field called, for example, number of DMRS port groups. This field can take $\lceil \log_2 N \rceil$ bits, and the number of DMRS port groups for current scheduled PDSCH transmission may be x+1, where x is the value of this field. Thus, the indication of DMRS port index by the field Antenna Port(s) can be based on the indicated number of DMRS port groups. Alternatively, the number of DMRS port groups can be jointly coded with DMRS port index indication by the field Antenna Port(s) in DCI.

In some embodiments, the number of DMRS port groups can be determined by the number of effective DMRS CDM group(s) for a current PDSCH transmission, where the number of effective DMRS CDM group(s) denotes the number of DMRS CDM group(s) used to transmit the DMRS associated with the current PDSCH transmission.

For example, denote the maximum number of DMRS port groups to be N_max, the number of effective DMRS CDM group(s) to be K, and the number of DMRS port groups to be N, then N=min{K, N_max}. When K>N_max, the association between a DMRS port group and an effective DMRS CDM group can be fixed or configured by higher layer signaling (for example, RRC signaling) or DCI.

In some embodiments, to track the phase shift from different DMRS port groups, the number of PT-RS APs can be equal to the number of DMRS port groups. Alternatively, some DMRS port groups may share the same oscillator, for example, they may be from different panels in a gNodeB, which indicates the phase noise should be common for those DMRS port groups. Then the number of PT-RS APs could be smaller than the DMRS port groups. Thus, the number of PT-RS APs can be configured by higher layer signaling (for example, RRC signaling) and/or DCI. In DCI, it can be configured by an independent field or be jointly coded with the field of Antenna Port(s). For example, the number of PT-RS APs may be smaller or equal to the number of DMRS APs.

Multiple DCI Based Multi-TRP and Multi-Panel Based Operation

In this mode, multiple DCIs can be used to schedule the PDSCH transmission from multiple gNBs (for example, TRPs 108 and 112), where the number of DCIs could be equal to the number of gNBs that transmit the PDSCH transmission.

In some embodiments, the number of DMRS port groups can be equal to the number of decoded DCIs. The configurations for each DMRS port group could be independent, and the configuration could include at least one of the following parameters: scrambling identity (ID), DMRS type, number of front-loaded symbols, position of additional DMRS symbols, PT-RS is present or not. In some embodiments, a subset or all of these parameters may be common to configurations of more than one DMRS port groups.

One DMRS port group can be mapped to one TCI state applied for PDSCH. Therefore, some embodiments may configure the DMRS port group related information within a TCI state.

In some embodiments, one TCI may be used for multiple DMRS port groups. A similar process may also be used for single DCI embodiments.

In some embodiments, the number of PT-RS APs can be determined by the number of DMRS port groups and/or the PT-RS configuration per DMRS port group. In one example, the number of PT-RS APs may be equal to the number of DMRS port groups.

If multiple DMRS port groups and multiple PT-RS APs are used, the PT-RS APs may be orthogonal. Then, for the resource elements (REs) used for PT-RS, PDSCH may be punctured or rate matched. Alternatively, the PT-RS APs may not be orthogonal, and the dynamic presence and time/frequency location for PT-RS scheduled by each DCI may be determined by the scheduling DCI independently. Then, for the antenna ports within a DMRS port group, the REs used for PT-RS AP within this DMRS port group may be "not available" for PDSCH.

Figure 3:
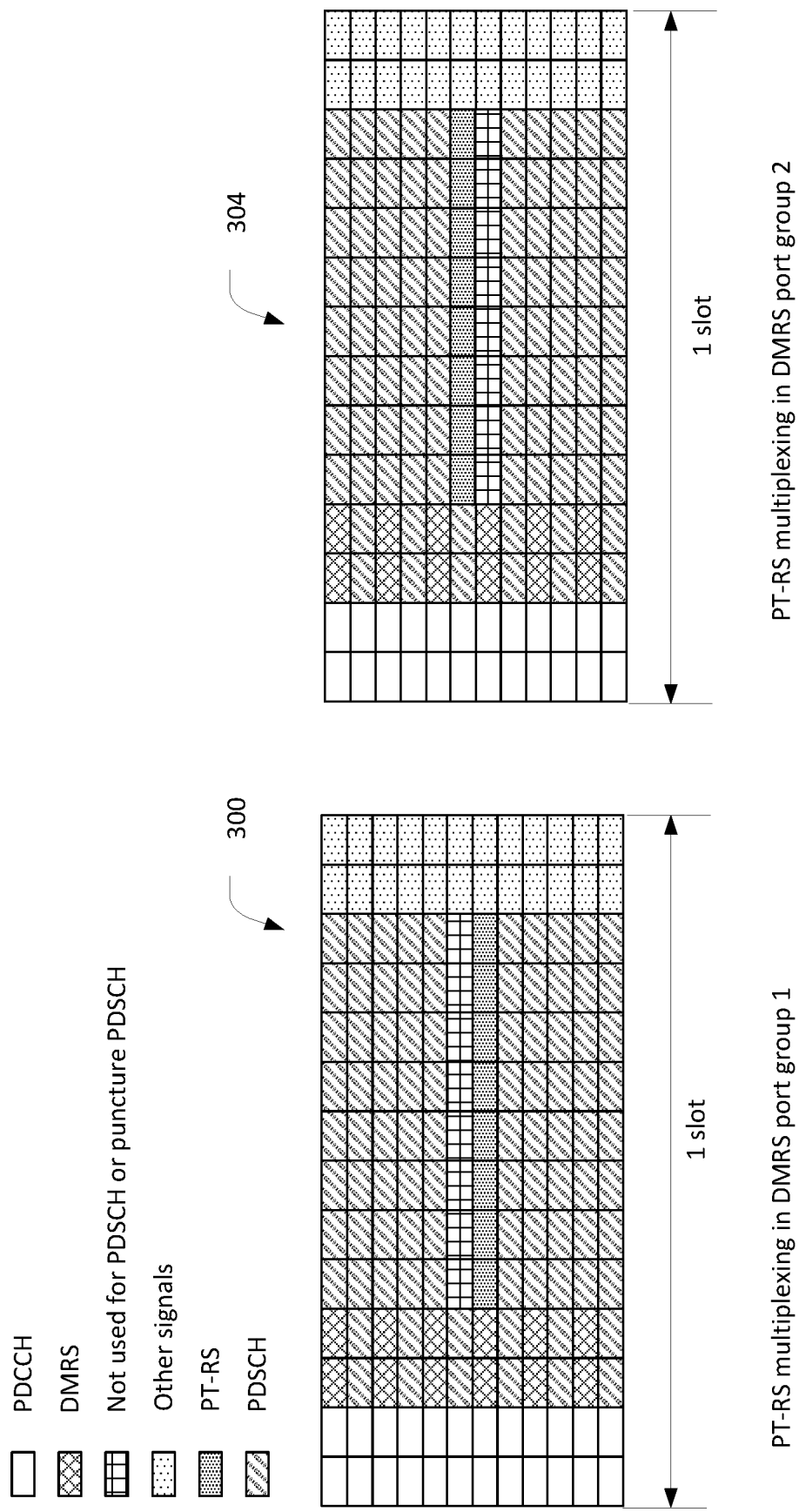
FIG. 3 illustrates two resource grids in accordance with some embodiments.

FIG. 3 illustrates resource grids 300 and 304 for PT-RS ports orthogonal multiplexing when two DMRS port groups are scheduled. In particular, resource grid 300 illustrates PT-RS multiplexing in DMRS port group 1 and resource grid 304 illustrates PT-RS multiplexing in DMRS port group 2.

As can be seen, the resource elements on which the PT-RS is transmitted for DMRS port group 1 in resource grid 300 are not available for PDSCH for DMRS port group 1 in resource grid 304, and vice versa.

In some embodiments, with regard to the control signaling to signal the orthogonal PT-RS as shown in FIG. 3, Zero-Power PT-RS (ZP PT-RS) could be applied. In one option, the ZP PT-RS can be independently indicated by DCI and/or RRC signaling, which includes the presence of ZP PT-RS and/or the time domain density and/or frequency domain density of ZP PT-RS. In another option, the ZP-PT-RS can be jointly indicated with number of PT-RS antenna ports. Table 4 illustrates one example for the indication of ZP-PTRS and non-zero-power (NZP) PT-RS antenna ports by a single field PT-RS antenna ports in DCI.

TABLE 4

An Example for PT-RS Antenna Ports Indication

| PT-RS antenna ports indicator | indication |
|---|---|
| 00 | 1 NZP PT-RS AP |
| 01 | 1 NZP PT-RS AP + 1 ZP PT-RS AP |
| 10 | 2 NZP PT-RS APs |
| 11 | reserved |

The time/frequency density for ZP PT-RS AP may be fixed, e.g. every 2nd RB and symbol, or can be indicated by DCI and/or RRC signaling, or can be determined by the scheduling MCS and/or bandwidth in the second DCI. The frequency offset for ZP PT-RS AP may be configured by DCI and/or RRC signaling or be determined by the AP index for another DMRS CDM group, e.g. lowest antenna port within another DMRS CDM group. Alternatively, the ZP PT-RS may be jointly coded with some resource mapping related indicator, e.g. ZP CSI-RS.

Note that for multiple DCI scheduling option, the terminology "DMRS port group x" in the section indicates the DMRS port scheduled by DCI from search space x or control resource set (CORESET) x.

Figure 4:
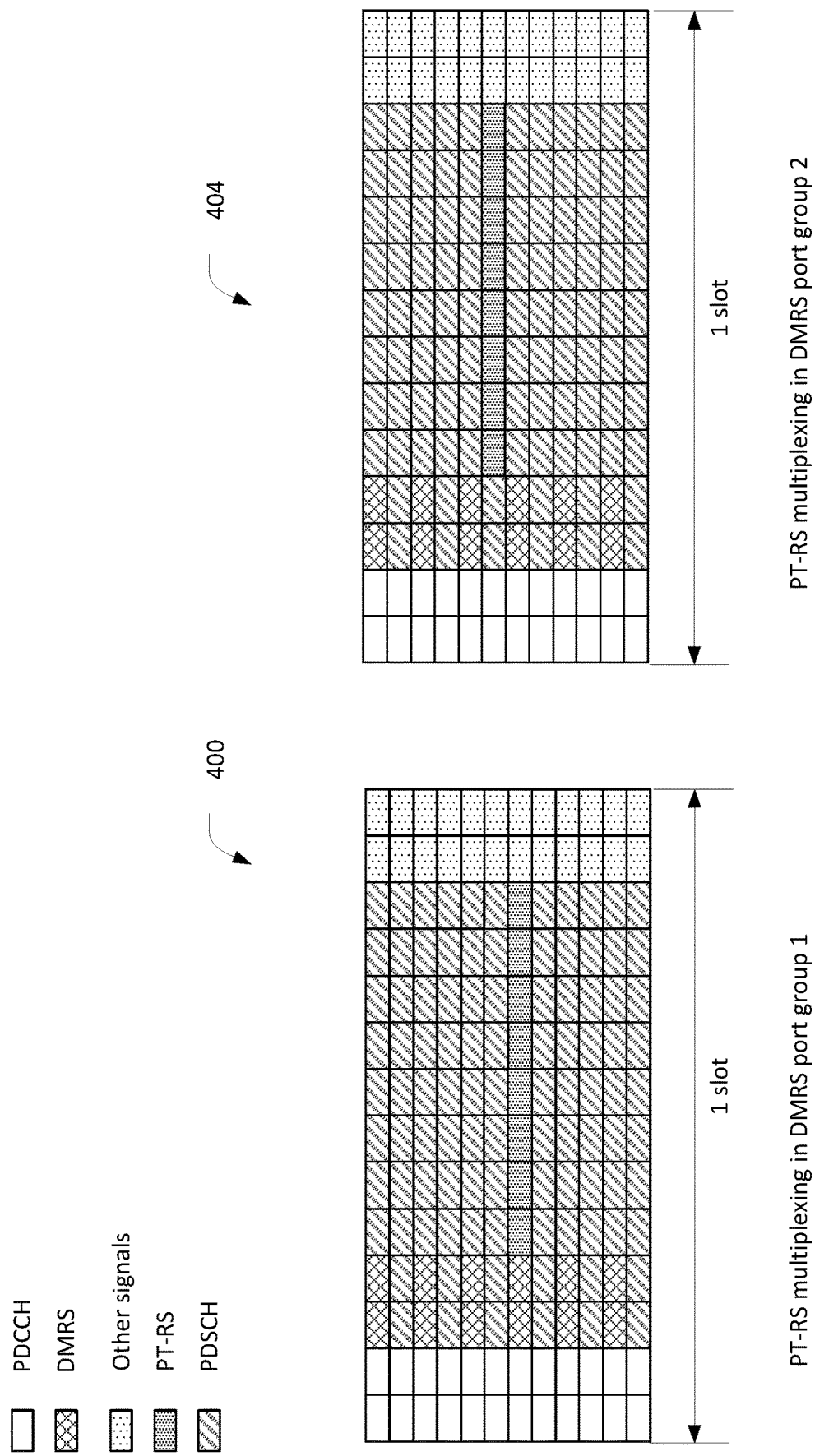
FIG. 4 illustrates two resource grids in accordance with some embodiments.

FIG. 4 illustrates resource grids 400 and 404 for PT-RS ports non-orthogonal multiplexing when two DMRS port groups are scheduled. In particular, resource grid 400 illustrates PT-RS multiplexing in DMRS port group 1 and resource grid 304 illustrates PT-RS multiplexing in DMRS port group 2.

Association Between PT-RS to DMRS Port Group

In some embodiments, the PT-RS AP and DMRS port group may be one-to-one, N-to-one, one-to-N mapped. If K PT-RS APs are mapped to one DMRS port group, the association between PT-RS APs to DMRS APs may be fixed, for example, PT-RS APs may be associated with a lowest K DMRS APs within this DMRS port group, or configured by higher layer signaling (for example, RRC signaling) or DCI.

With the mapping between the PT-RS AP and DMRS port groups known, the UE 104 can compare the estimated channel between the PT-RS and corresponding DMRS port to calculate the phase shift.

In one example, if up to two DMRS ports groups and up to two PT-RS APs can be configured, with an association be based on Table 5.

TABLE 5

Example for DMRS Port Group to PT-RS association

| | 1 DMRS port group | 2 DMRS port group |
|---|---|---|
| 1 PT-RS AP | PT-RS AP is associated with DMRS AP with lowest index in the codeword with higher MCS or codeword 0 if MCS for both codewords are the same | PT-RS AP is associated with DMRS AP with lowest index in the codeword with higher MCS or codeword 0 if MCS for both codewords are the same |
| 2 PT-RS APs | Option 1: Not allowed Option 2: the first PT-RS AP is associated with DMRS AP with lowest index in the first codeword and the second PT-RS AP is associated with DMRS AP with lowest index in the second codeword Option 3: the PT-RS APs are associated with the first 2 DMRS APs. | The first PT-RS AP is associated with DMRS AP with lowest index in the first DMRS port group, and the second PT-RS AP is associated with DMRS AP with lowest index in the second DMRS port group |

Figure 5:
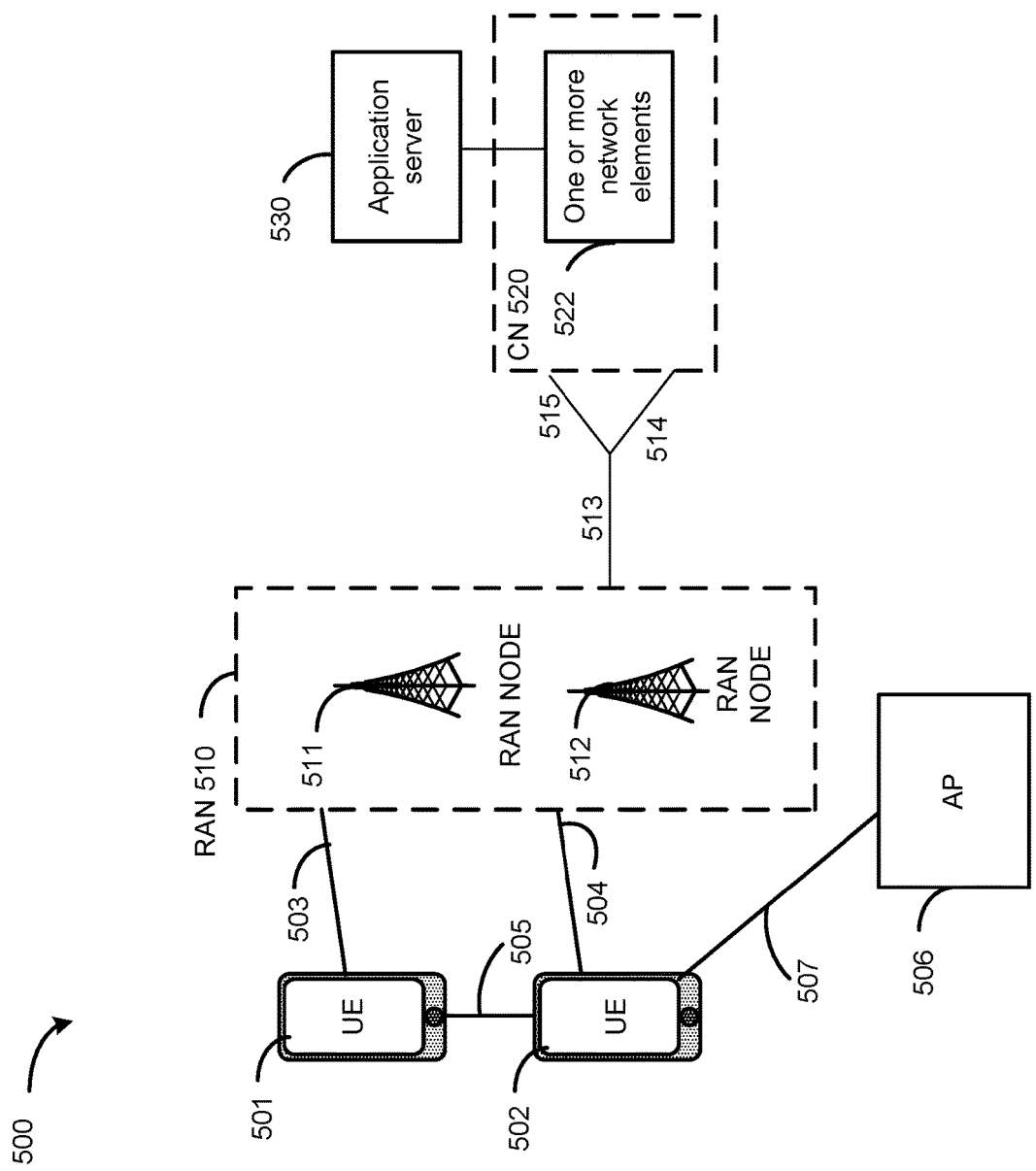
FIG. 5 illustrates an architecture of a system of a network in accordance with some embodiments.

FIG. 5 illustrates an example architecture of a system 500 of a network is shown, in accordance with various embodiments. The following description is provided for an example system 500 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 5, the system 500 may include user equipment (UE) 501a and UE 501b (collectively referred to as "UEs 501" or "UE 501"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with a access network (AN) or radio access network (RAN) 510. In embodiments, the RAN 510 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 501 may directly exchange communication data via a ProSe interface 505. The ProSe interface 505 may alternatively be referred to as a sidelink (SL) interface 505 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 501b is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 501b, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 501b in RRC CONNECTED being configured by a RAN node 511 to utilize radio resources of LTE and WLAN. LWIP operation may involve the UE 501b using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users.

These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 511 that operates in an NR or 5G system 500 (for example a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 511 may be implemented as one or more software entities running on server computers as part of a virtual network, which may be referred to as a cloud radio access network (CRAN). In other embodiments, the RAN nodes 511 may represent individual gNB-distributed units (DUs) that are connected to a gNB-centralized unit (CU) via an F1 interface (not shown by FIG. 5).

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using Orthogonal Frequency-Division Multiplexing (OFDM) communication signals with each other or with any of the RAN nodes 511 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 104, 501, 502 while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 104, 501, 502 and the RAN nodes 511, 512 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 104, 501, 502 and the RAN nodes 511, 512 may operate using Licensed Assisted Access (LAA), enhanced LAA (eLAA), and/or further eLAA (feLAA) mechanisms. In these implementations, the UEs 104, 501, 502 and the RAN nodes 511, 512 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 104, 501, 502, RAN nodes 511, 512, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 501 or 502, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (µs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 501, 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 501. The physical downlink control channel (PDCCH) may carry information about the transport format and resource allocations related to the PDSCH channel, among other things. It may also inform the UEs 501 about the transport format, resource allocation, and H-ARQ (Hybrid Automatic Repeat Request) information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, Core Network (CN) 520. The CN 520 may comprise a plurality of network elements 522, which are configured to offer various data and telecommunications services to customers/subscribers (e.g., users of UEs 501) who are connected to the CN 520 via the RAN 510. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS Packet Services (PS) domain, LTE PS data services, etc.). The application server 530 can also be configured to support one or more communication services (e.g., Voice-over-Internet Protocol (VoIP) sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a user plane function (UPF), and the S1 control plane (NG-C) interface 515, which is a signaling interface between the RAN nodes 511 and Access and Mobility Functions (AMFs).

In embodiments, the CN 520 may be a 5G CN (referred to as "5GC 520" or the like), while in other embodiments, the CN 520 may be an Evolved Packet Core (EPC)). Where CN 520 is an EPC (referred to as "EPC 520" or the like), the RAN 510 may be connected with the CN 520 via an S1 interface 513. In embodiments, the S1 interface 53 may be split into two parts, an S1 user plane (S1-U) interface 514, which carries traffic data between the RAN nodes 511 and the serving gateway (S-GW), and the S1-mobility management entity (MME) interface 515, which is a signaling interface between the RAN nodes 511 and MMEs.

Figure 6:
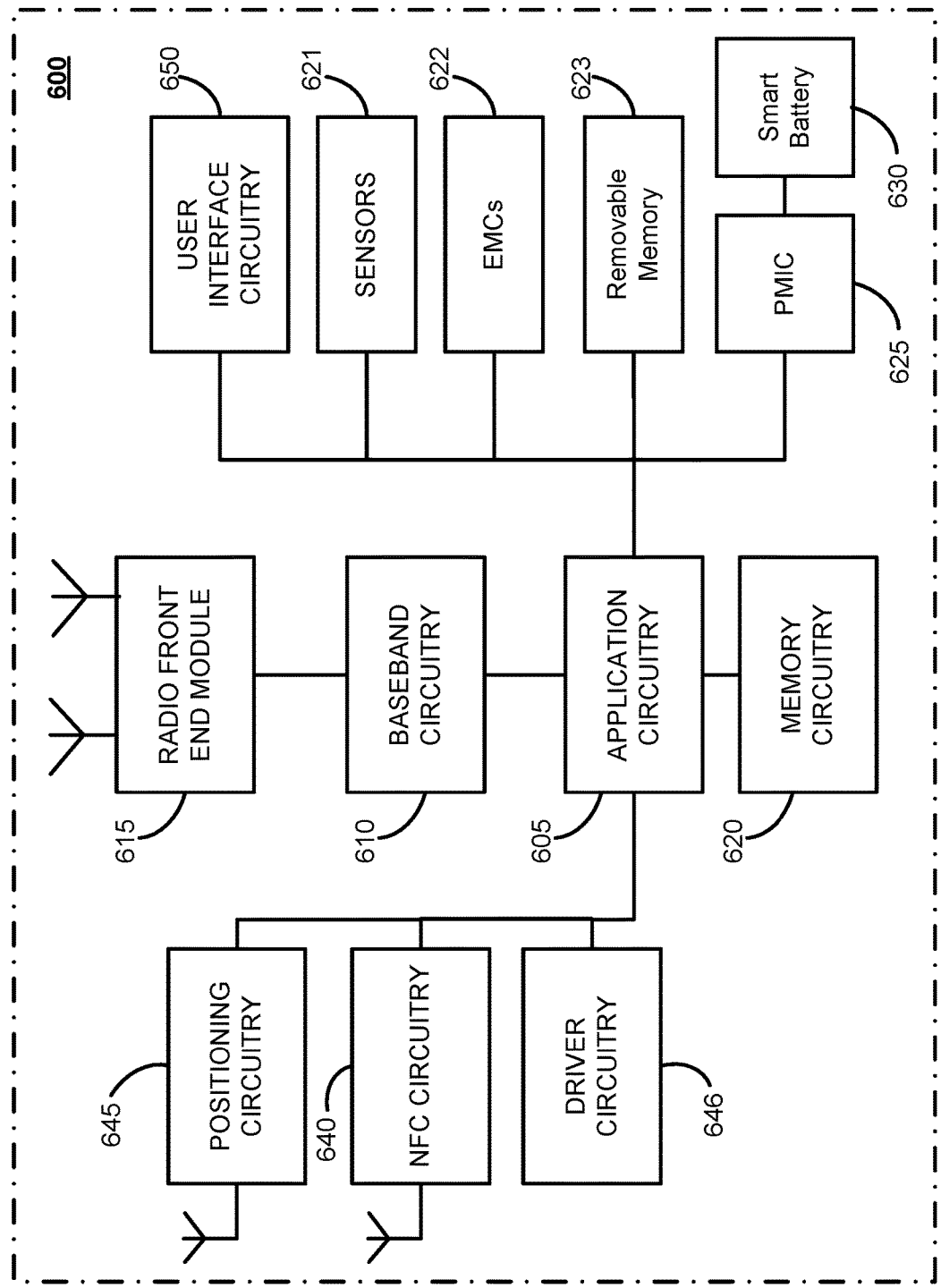
FIG. 6 depicts example components of a computer platform in accordance with various embodiments.

FIG. 6 illustrates an example of a platform 600 (or "device 600") in accordance with various embodiments. In embodiments, the computer platform 600 may be suitable for use as UEs 501, 502, application servers 530, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

The application circuitry 605 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 600. In some embodiments, processors of application circuitry 605 may process IP data packets received from an EPC or 5GC.

Application circuitry 605 be or include a microprocessor, a multi-core processor, a multithreaded processor, an ultra-low voltage processor, an embedded processor, or other known processing element. In one example, the application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components.

In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include any number and type of memory devices used to provide for a given amount of system memory. As examples, the memory circuitry 620 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to coupled portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry may include sensors 621, such as accelerometers, level sensors, flow sensors, temperature sensors, pressure sensors, barometric pressure sensors, and the like. The interface circuitry may be used to connect the platform 600 to electro-mechanical components (EMCs) 622, which may allow platform 600 to change its state, position, and/or orientation, or move or control a mechanism or system. The EMCs 622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 may be configured to operate one or more EMCs 622 based on one or more captured events and/or instructions or control signals received from a service provider and/or various clients.

In some implementations, the interface circuitry may connect the platform 600 with positioning circuitry 645, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

User interface circuitry 650 may include one or more user interfaces designed to enable user interaction with the system 600 or peripheral component interfaces designed to enable peripheral component interaction with the system 600. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

In some implementations, the interface circuitry may connect the platform 600 with near-field communication (NFC) circuitry 640, which may include an NFC controller coupled with an antenna element and a processing device. The NFC circuitry 640 may be configured to read electronic tags and/or connect with another NFC-enabled device.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensors 621 and control and allow access to sensors 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in a UE 104, 501, or 502.

In some embodiments, the PMIC 625 may control, or otherwise be part of, various power saving mechanisms of the platform 600. For example, if the platform 600 is in an RRC Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block 528 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 600 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 7:
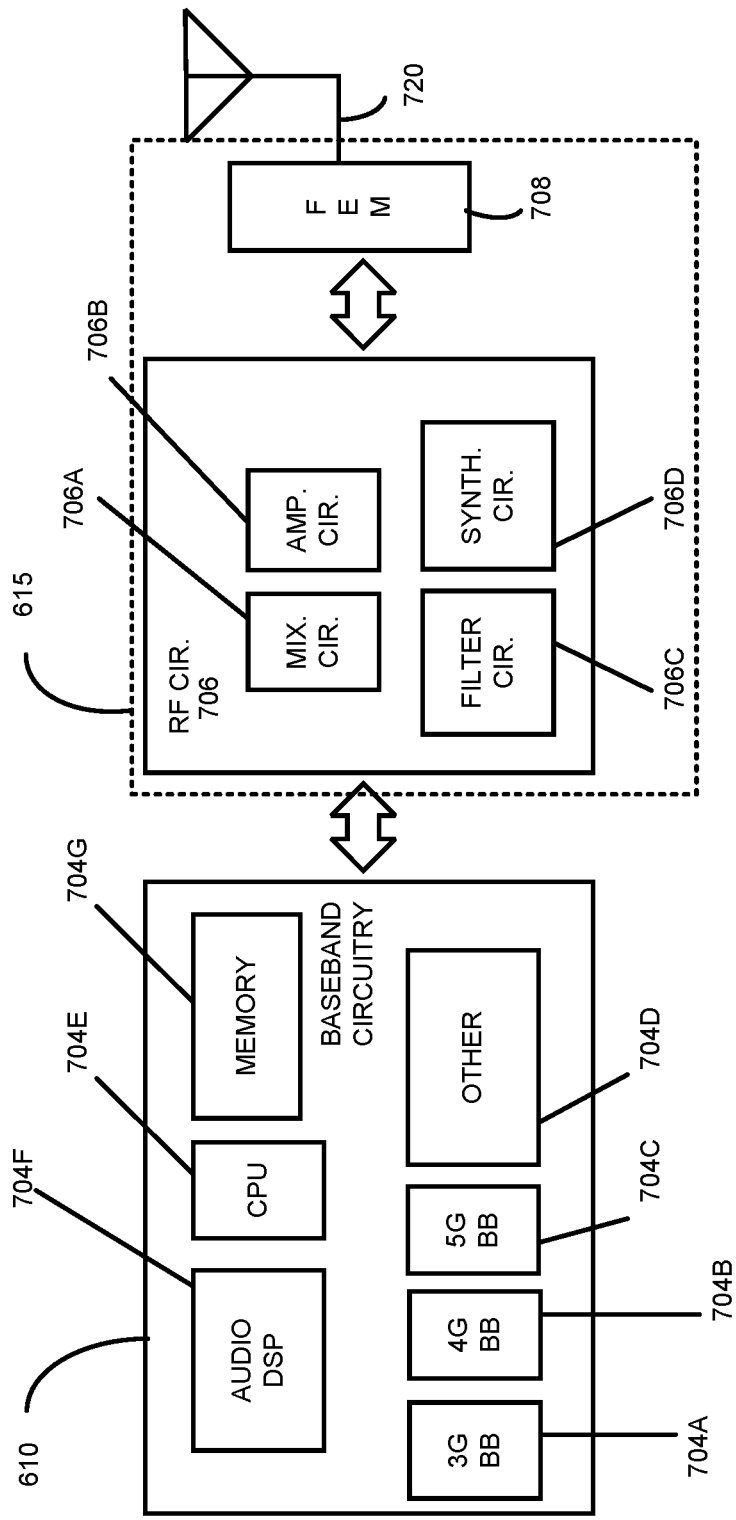
FIG. 7 depicts example components of baseband circuitry and radio frequency circuitry in accordance with various embodiments.

FIG. 7 illustrates example components of baseband circuitry 610 and radio front end modules (RFEM) 615 in accordance with various embodiments. As shown, the RFEM 615 may include Radio Frequency (RF) circuitry 706, front-end module (FEM) circuitry 7108, one or more antennas 7111 coupled together at least as shown.

The baseband circuitry 610 may include circuitry such as, but not limited to, one or more single-core or multi-core processors. The baseband circuitry 610 may include one or more baseband processors or control logic to process baseband signals received from a receive signal path of the RF circuitry 706 and to generate baseband signals for a transmit signal path of the RF circuitry 706. Baseband processing circuitry 610 may interface with the application circuitry 605 for generation and processing of the baseband signals and for controlling operations of the RF circuitry 706. For example, in some embodiments, the baseband circuitry 610 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 610 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 610 and the application circuitry 605 may be implemented together such as, for example, on a system on a chip (SOC).

In some embodiments, the baseband circuitry 610 may provide for communication compatible with one or more radio technologies. For example, in some embodiments, the baseband circuitry 610 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 610 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 7108 and provide baseband signals to the baseband circuitry 610. RF circuitry 706 may also include a transmit signal path which may include circuitry to up-convert baseband signals provided by the baseband circuitry 610 and provide RF output signals to the FEM circuitry 7108 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 7108 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 7108. The baseband signals may be provided by the baseband circuitry 610 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 610 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 610 or the applications processor 605 depending on the desired output frequency. In some embodiments, a divider control input (e.g., N) may be determined from a look-up table based on a channel indicated by the applications processor 605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 7108 may include a receive signal path which may include circuitry configured to operate on RF signals received from one or more antennas 7111, amplify the received signals and provide the amplified versions of the received signals to the RF circuitry 706 for further processing. FEM circuitry 7108 may also include a transmit signal path which may include circuitry configured to amplify signals for transmission provided by the RF circuitry 706 for transmission by one or more of the one or more antennas 7111. In various embodiments, the amplification through the transmit or receive signal paths may be done solely in the RF circuitry 706, solely in the FEM 7108, or in both the RF circuitry 706 and the FEM 7108.

In some embodiments, the FEM circuitry 7108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 7108 may include a power amplifier (PA) to amplify input RF signals (e.g., provided by RF circuitry 706), and one or more filters to generate RF signals for subsequent transmission (e.g., by one or more of the one or more antennas 7111).

Processors of the application circuitry 605 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the baseband circuitry 610 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
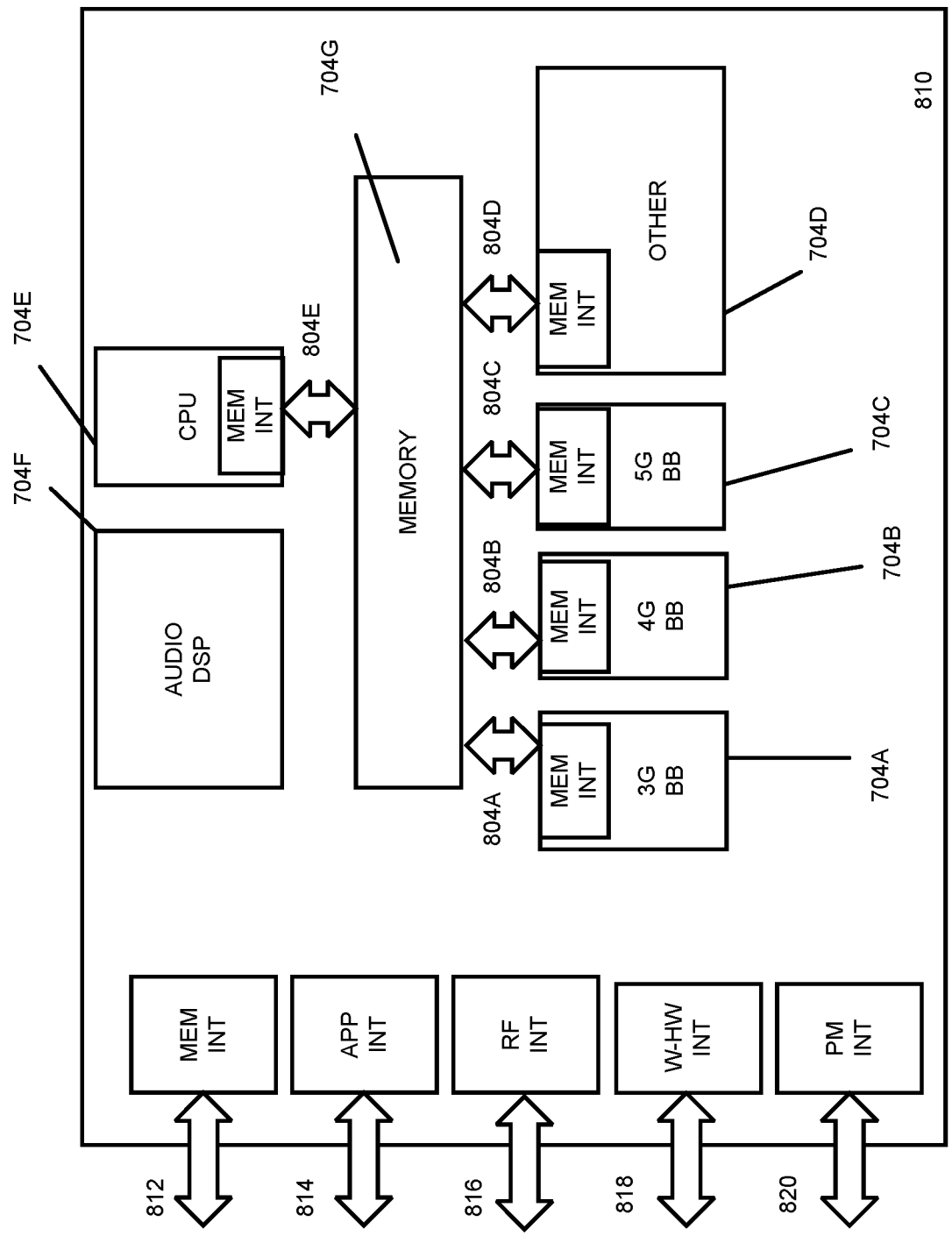
FIG. 8 depicts example interfaces of baseband circuitry in accordance with some embodiments.

FIG. 8 illustrates example interfaces of baseband circuitry in accordance with various embodiments. As discussed above, the baseband circuitry 610 of FIGS. 6 and 7 may comprise processors 704A-704E and a memory 704G utilized by said processors. Each of the processors 704A-704E may include a memory interface, 804A-804E, respectively, to send/receive data to/from the memory 704G.

The baseband circuitry 610 may further include one or more interfaces to communicatively couple to other circuitries/devices, such as a memory interface 812 (e.g., an interface to send/receive data to/from memory external to the baseband circuitry 610), an application circuitry interface 814 (e.g., an interface to send/receive data to/from the application circuitry 605 of FIG. 6), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMIC 625.

Figure 9:
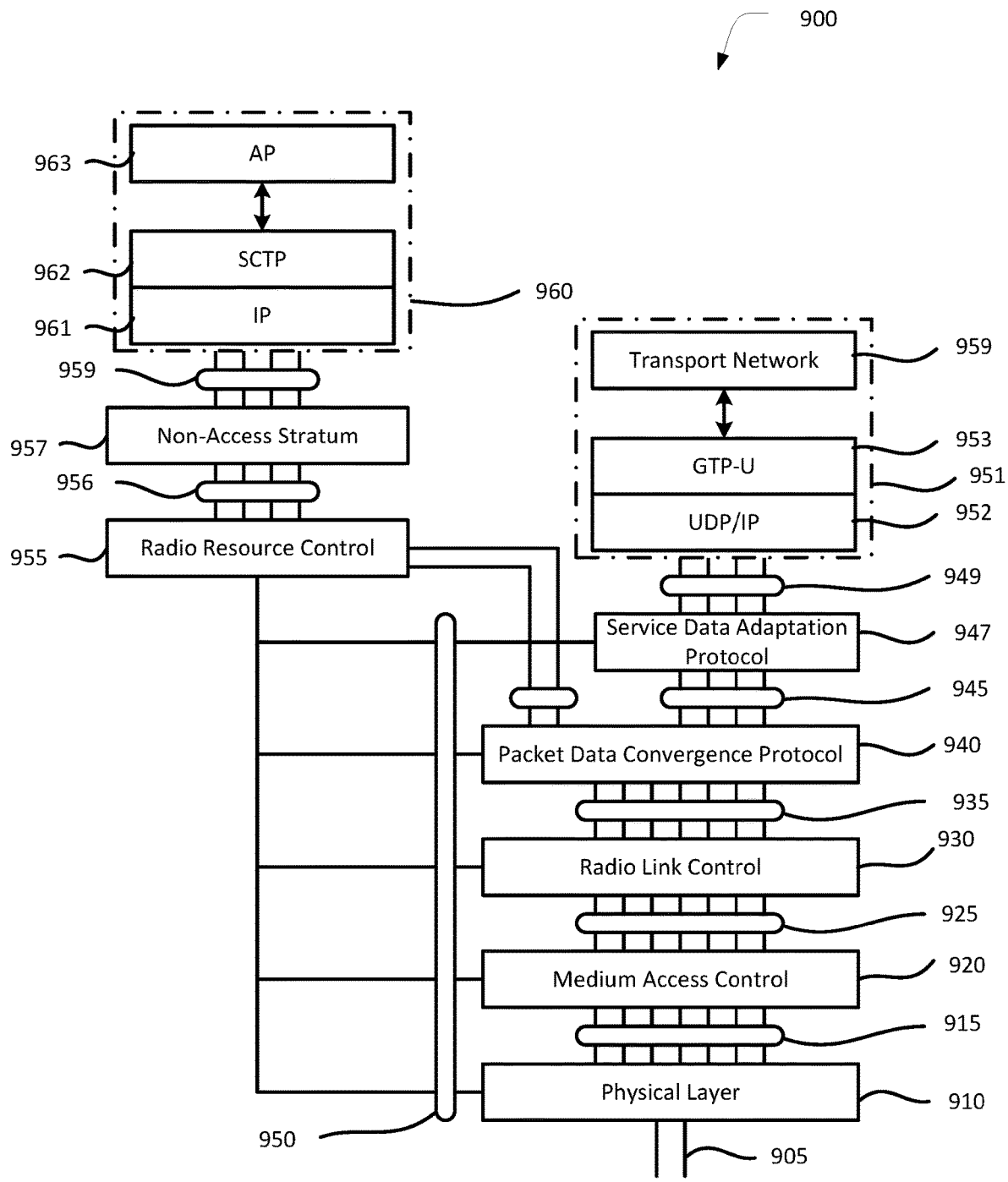
FIG. 9 is an illustration of a various protocol functions that may be used for various protocol stacks in accordance with various embodiments.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the Fifth Generation (5G) or New Radio (NR) system standards and LTE system standards, but some or all of the aspects of FIG. 9 may be applicable to other wireless communication network systems as well.

The protocol layers of arrangement 900 may include one or more of a physical layer (PHY) 910, a medium access control layer (MAC) 920, a radio link control layer (RLC) 930, a packet data convergence protocol layer (PDCP) 940, a service data adaptation protocol layer (SDAP) 947, a radio resource control layer (RRC) 955, and a non-access stratum (NAS) layer 957, in addition to other higher layer functions not illustrated. The protocol layers may include one or more service access points (e.g., items 959, 956, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 910 may process requests from and provide indications to an instance of MAC 920 via one or more physical layer service access points (PHY-SAP) 915. According to some embodiments, requests and indications communicated via PHY-SAP 915 may comprise one or more transport channels.

Instance(s) of MAC 920 may process requests from, and provide indications to an instance of RLC 930 via one or more medium access control service access points (MAC-SAP) 925. These requests and indications communicated via the MAC-SAP 925 may comprise one or more logical channels. The MAC 920 may perform mapping between the logical channels and transport channels, multiplexing of MAC SDUs from one or more logical channels onto transport blocks (TB) to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through hybrid automatic repeat request (HARD), and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels.

The RLC 930 may operate in a plurality of modes of operation, including: Transparent Mode™, Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more service data adaptation protocol service access points (SDAP-SAP) 949. These requests and indications communicated via SDAP-SAP 949 may comprise one or more quality of service (QoS) flows. The SDAP 947 may map QoS flows to data radio bearers (DRBs), and vice versa, and may also mark QoS flow IDs (QFIs) in DL and UL packets. A single SDAP entity 947 may be configured for an individual PDU session. In the UL direction, the NG-RAN 520 may control the mapping of QoS Flows to DRB(s) in two different ways, reflective mapping or explicit mapping. For reflective mapping, the SDAP 947 of a UE 501 may monitor the QoS flow ID(s) of the DL packets for each DRB, and may apply the same mapping for packets flowing in the UL direction. For a DRB, the SDAP 947 of the UE 501 may map the UL packets belonging to the QoS flows(s) corresponding to the QoS flow ID(s) and PDU Session observed in the DL packets for that DRB. To enable reflective mapping, an NG-RAN may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC service access points (RRC-SAP) 956. The main services and functions of the RRC 955 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 501 and RAN 520 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 957 may form the highest stratum of the control plane between the UE 501 and an AMF. The NAS 957 may support the mobility of the UEs 501 and the session management procedures to establish and maintain IP connectivity between the UE 101 and a P-GW in LTE systems.

According to various embodiments, one or more protocol entities of arrangement 900 may be implemented in UEs 104, 501, 502; RAN nodes 108, 112, 511, 512, or the like to be used for control plane or user plane communications protocol stack between the aforementioned devices. In such embodiments, one or more protocol entities that may be implemented in one or more of UEs 104, 501, 502; RAN nodes 108, 112, 511, 512, etc. may communicate with a respective peer protocol entity that may be implemented in or on another device using the services of respective lower layer protocol entities to perform such communication.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an internet protocol layer (IP) 961, an Stream Control Transmission Protocol layer (SCTP) 862, and an application layer signaling protocol (AP) 963.

In NR implementations, the AP 963 may be an NG application protocol layer (NGAP or NG-AP) 963 for the NG interface 513 defined between the NG-RAN node 511 and the AMF, or the AP 963 may be an Xn application protocol layer (XnAP or Xn-AP) 963 for the Xn interface 512 that is defined between two or more RAN nodes 511.

The NG-AP 963 may support the functions of the NG interface and may comprise Elementary Procedures (EPs). An NG-AP EP may be a unit of interaction between an NG-RAN node and AMF. The NG-AP 963 services may comprise two groups: UE-associated services and non-UE-associated services (e.g., services related to the whole NG interface instance between an NG-RAN node and an AMF). These services may include functions including, but not limited to: a paging function for the sending of paging requests to NG-RAN nodes involved in a particular paging area; UE Context management function for allowing an AMF to establish, modify, and/or release a UE Context in the AMF and the NG-RAN node; mobility function for UEs in ECM-CONNECTED mode for intra-system HOs to support mobility within NG-RAN and inter-system HOs to support mobility from/to EPS systems; NAS Signaling Transport function for transporting or rerouting NAS messages between UE and AMF; a NAS node selection function for determining an association between the AMF and the UE 501; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes via CN; and/or other like functions.

The XnAP 963 may support the functions of an Xn interface and may comprise XnAP basic mobility procedures and XnAP global procedures. The XnAP basic mobility procedures may comprise procedures used to handle UE mobility within the NG RAN (or E-UTRAN), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE, such as Xn interface setup and reset procedures, NG-RAN update procedures, cell activation procedures, and the like.

In LTE implementations, the AP 963 may be an S1 Application Protocol layer (S1-AP) 963 for the S1 interface defined between an E-UTRAN node and an MME, or the AP 963 may be an X2 application protocol layer (X2AP or X2-AP) 963 for the X2 interface that is defined between two or more E-UTRAN nodes.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node and an MME within an LTE CN. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface and may comprise X2AP basic mobility procedures and X2AP global procedures. The X2AP basic mobility procedures may comprise procedures used to handle UE mobility within the E-UTRAN, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 963 may ensure reliable delivery of signaling messages between the RAN node and the AMF/MME based, in part, on the IP protocol, supported by the IP 961. The Internet Protocol layer (IP) 961 may be used to perform packet addressing and routing functionality. In some implementations the IP layer 961 may use point-to-point transmission to deliver convey PDUs. In this regard, the RAN node may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 920, and PHY 910. The user plane protocol stack may be used for communication between the UE, the RAN node, and UPF in NR implementations or an S-GW and P-GW in LTE implementations. In this example, upper layers 951 may be built on top of the SDAP, and may include a user datagram protocol (UDP) and IP security layer (UDP/IP) 952, a General Packet Radio Service (GPRS) Tunneling Protocol for the user plane layer (GTP-U) 953, and a User Plane Protocol Data Unit layer (UP PDU) 963.

The transport network layer 954 (also referred to as a "transport layer") may be built on IP transport, and the GTP-U 951 may be used on top of the UDP/IP layer (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node and the S-GW may utilize an S1-U interface to exchange user plane data via a protocol stack comprising an L1 layer 911, an L2 layer, the UDP/IP layer 952, and the GTP-U 953. The S-GW and the P-GW may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE and the session management procedures to establish and maintain IP connectivity between the UE and the P-GW.

Moreover, although not shown by FIG. 9, an application layer may be present above the AP 963 and/or the transport network layer 954. The application layer may be a layer in which a user of the UE, RAN node, or other network element interacts with software applications being executed, for example, by application circuitry 605. The application layer may also provide one or more interfaces for software applications to interact with communications systems of the UE 501 or RAN node 511, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 10:
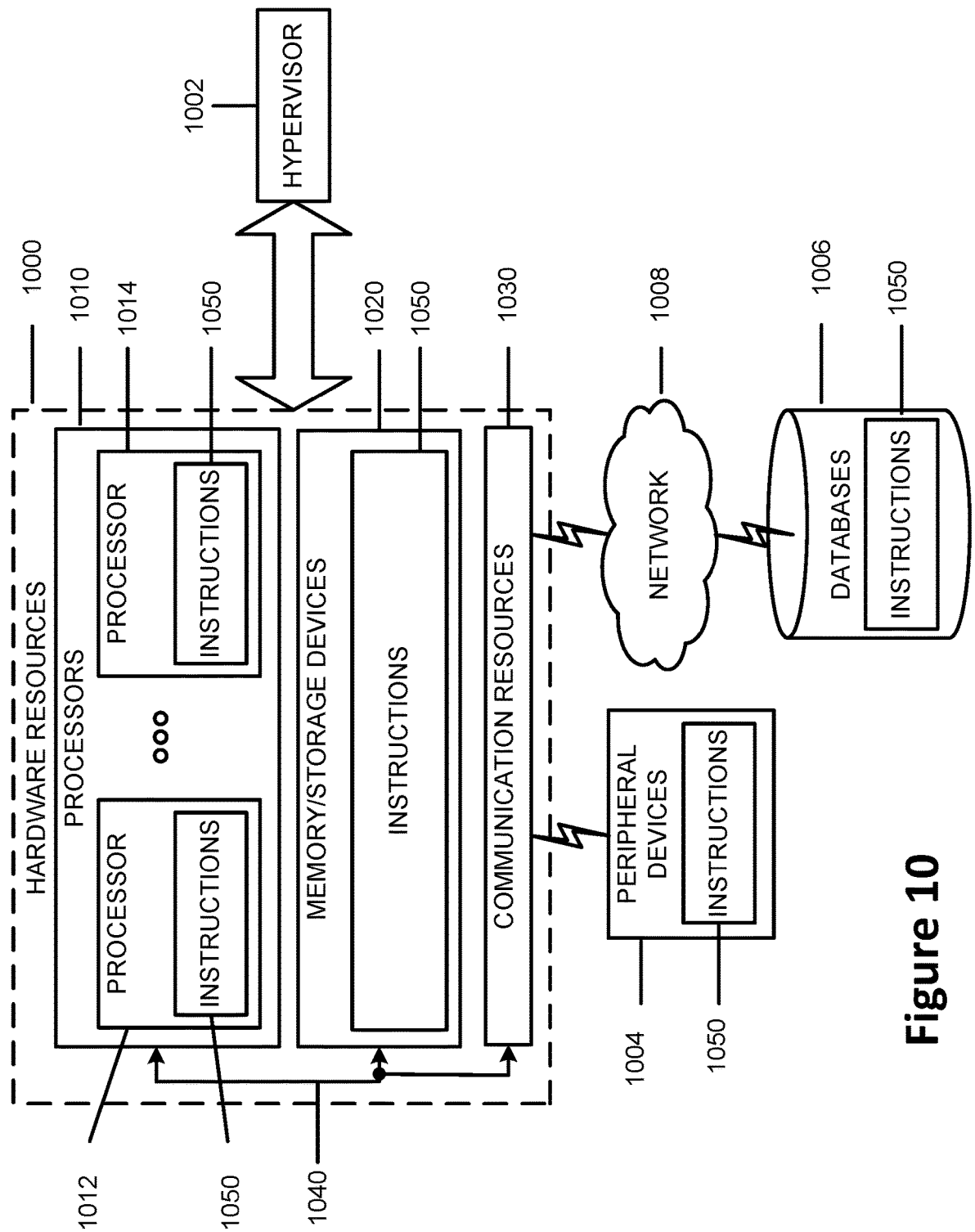
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/subslices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of operating a User Equipment (UE), the method comprising determining a demodulation reference signal (DMRS) port group and a phase tracking reference signal (PT-RS) pattern to receive a downlink signal from multiple gNodeBs or multiple gNodeB panels.

Example 2 includes the method of example 1 and/or some other examples herein, wherein the UE is to report the number of DMRS port groups as a UE capability.

Example 3 includes the method of example 1 and/or some other examples herein, wherein whether a single DCI or multiple DCI can be used to schedule PDSCH in one transmission duration could be configured by higher layer signaling and/or be based on a UE capability.

Example 4 includes the method of example 1 and/or some other examples herein, wherein a UE can determine the number of DM-RS port groups and number of PT-RS antenna ports (APs) when a single DCI is used to schedule PDSCH from multiple gNodeBs or multiple panels.

Example 5 includes the method of example 4 and/or some other examples herein, wherein in a Transmission Configuration Indication (TCI) state, more than one reference signal with the same quasi-co-location (QCL) type can be configured.

Example 6 includes the method of example 4 and/or some other examples herein, wherein the number of DMRS port groups for a PDSCH transmission can be determined by the number of reference signals for a QCL type in corresponding TCI state for current PDSCH transmission.

Example 7 includes the method of example 5 and/or some other examples herein, wherein UE shall expect the number of reference signals for all the QCL types configured in a TCI state to be equal.

Example 8 includes the method of example 5 and/or some other examples herein, wherein UE shall determine the number of DMRS port groups based on the number of reference signals for a particular QCL type.

Example 9 includes the method of example 4 and/or some other examples herein, wherein the number of DMRS port groups can be indicated by DCI, which can be based on an independent field number of DMRS port groups.

Example 10 includes the method of example 4 and/or some other examples herein, wherein the number of DMRS port groups can be jointly coded with DMRS port index indication by the field Antenna Port(s) in DCI.

Example 11 includes the method of example 4 and/or some other examples herein, wherein the number of DMRS port groups can be determined by the number of effective DMRS CDM group(s) for current PDSCH transmission, where the number of effective DMRS CDM group(s) denotes the number of DMRS CDM group(s) used to transmit the DMRS associated with current PDSCH transmission.

Example 12 includes the method of example 4 and/or some other examples herein, wherein the number of PT-RS APs can be equal to the number of DMRS port groups.

Example 13 includes the method of example 4 and/or some other examples herein, wherein the number of PT-RS APs could be smaller than the DMRS port groups.

Example 14 includes the method of example 13 and/or some other examples herein, wherein the number of PT-RS APs can be configured by higher layer signaling and/or DCI.

Example 15 includes the method of example 1 and/or some other examples herein, wherein a UE can determine the number of DM-RS port groups and number of PT-RS antenna ports (APs) when multiple DCI are used to schedule PDSCH from multiple gNodeBs or multiple panels.

Example 16 includes the method of example 15 and/or some other examples herein, wherein the number of DMRS port groups can be equal to the number of decoded DCIs.

Example 17 includes the method of example 16 and/or some other examples herein, wherein DMRS port group x indicates the DMRS port scheduled by DCI from search space x or control resource set (CORESET) x.

Example 18 includes the method of example 15 and/or some other examples herein, wherein the configurations for each DMRS port group could be independent, and the configuration could include at least one of the following parameters: scrambling ID, DMRS type, number of front-loaded symbols, position of additional DMRS symbols, PT-RS is present or not.

Example 19 includes the method of example 15 and/or some other examples herein, wherein if multiple DMRS port groups and multiple PT-RS APs are used, the PT-RS APs may be orthogonal.

Example 20 includes the method of example 19 and/or some other examples herein, wherein for the resource elements (REs) used for PT-RS, PDSCH should be punctured or rate matched.

Example 21 includes the method of example 20 and/or some other examples herein, wherein the zero power (ZP) PT-RS can be independently indicated by the DCI and/or RRC signaling, which includes the presence of ZP PT-RS and/or the time domain density and/or frequency domain density of ZP PT-RS.

Example 22 includes the method of example 20 and/or some other examples herein, wherein the ZP-PT-RS can be jointly indicated with number of PT-RS antenna ports.

Example 23 includes the method of example 20 and/or some other examples herein, wherein the time/frequency density for ZP PT-RS AP may be fixed or can be indicated by DCI and/or RRC signaling, or can be determined by the scheduling MCS and/or bandwidth in the second DCI.

Example 24 includes the method of example 20 and/or some other examples herein, wherein the frequency offset for ZP PT-RS AP may be configured by DCI and/or RRC signaling or be determined by the AP index for another DMRS CDM group.

Example 25 includes the method of example 20 and/or some other examples herein, wherein the ZP PT-RS may be jointly coded with some resource mapping related indicator.

Example 26 includes the method of example 15 and/or some other examples herein, wherein the PT-RS APs may not be orthogonal.

Example 27 includes the method of example 26 and/or some other examples herein, wherein the dynamic presence and time/frequency location for PT-RS scheduled by each DCI is determined by the scheduling DCI independently.

Example 28 includes the method of example 1 and/or some other examples herein, wherein the PT-RS AP and DMRS port group may be one-to-one, and/or N-to-one, and/or one-to-N mapped.

Example 29 includes the method of example 28 and/or some other examples herein, wherein if one PT-RS AP is indicated and one or more than one DMRS port groups are configured, PT-RS AP is associated with DMRS AP with lowest index in the codeword with higher MCS or codeword 0 if MCS for both codewords are the same.

Example 30 includes the method of example 28 and/or some other examples herein, wherein UE shall not expect to be configured with more PT-RS APs than DMRS port groups.

Example 31 includes the method of example 28 and/or some other examples herein, wherein when 1 DMRS port group is configured, and 2 PT-RS APs are configured, the first PT-RS AP is associated with DMRS AP with lowest index in the first codeword and the second PT-RS AP is associated with DMRS AP with lowest index in the second codeword.

Example 32 includes the method of example 28 and/or some other examples herein, wherein when 1 DMRS port group is configured, and 2 PT-RS APs are configured, the PT-RS APs are associated with the first 2 DMRS APs.

Example 33 includes the method of example 28 and/or some other examples herein, wherein when the number of PT-RS APs and number of DMRS ports groups are equal, one PT-RS port is associated with the first DMRS port within one DMRS port group.

Example 34 includes the method comprising: determining determine a number of demodulation reference signal (DMRS) port groups for a physical downlink shared channel (PDSCH) transmission; receiving one or more DMRSs via the number of DMRS port groups; and demodulating the PDSCH transmission based on reception of the one or more DMRSs.

Example 35 includes the method of example 34 or some other example herein, further comprising: determining a number of reference signals for a quasi-co-location (QCL) type; and determining the number of DMRS port groups based on the number of reference signals for the QCL type.

Example 36 includes the method of example 35 or some other example herein, further comprising: determining the number of reference signal for the QCL type based on a transmission configuration indication (TCI) state.

Example 37 includes the method of example 34 or some other example herein, further comprising: receiving downlink control information that includes a value for a field; and determine the number of DMRS port groups based on the value.

Example 38 includes the method of example 34 or some other example herein, further comprising: determining a number of effective DMRS code-division multiplexing (CDM) groups; determining the number of DMRS port groups based on the number of effective DMRS CDM groups; and determining, based on downlink control information and one or more tables, a DMRS port index, wherein DMRS port indices in different DMRS port groups are within different DMRS CDM groups.

Example 39 includes the method of example 34 or some other example herein, further comprising: determining a number of phase tracking-reference signal (PT-RS) antenna ports; receiving one or more PT-RSs on the number of PT-RS antenna ports; and processing the PDSCH transmission based on reception of the one or more PT-RSs.

Example 40 includes the method of example 39 or some other example herein, further comprising: determining the number of PT-RS antenna ports based on the number of DMRS port groups, higher-layer signaling, or downlink control information.

Example 41 includes the method of example 34 or some other example herein, further comprising: determining a number of downlink control information (DCI) transmissions used to schedule the PDSCH transmission from a plurality of gNBs; and determining the number of DMRS port groups based on the number of DCI transmissions.

Example 42 includes the method of example 34 or some other example herein, further comprising: determining configurations for individual DMRS port groups of the number of DMRS port groups, wherein the individual configurations have one or more parameters including scrambling identity, DMRS type, number of front-loaded symbols, position of additional DMRS symbols, or an indication of a presence of a phase tracking reference signal.

Example 43 includes the method of example 42 or some other example herein, wherein a subset or all of the parameters are common to configurations of more than one DMRS port groups of the number of DMRS port groups.

Example 44 includes a method of example 42 or some other example herein, further comprising determining a configuration of a DMRS port group based on a transmission configuration indication state to which the DMRS port group is mapped.

Example 45 includes the method of example 34 some other example herein, further comprising: determining a mapping between one or more phase tracking-reference signal (PT-RS) antenna ports and at least one DMRS port group, wherein the mapping is a one-to-one, an N-to-one, or a one-to-N mapping, where N is an integer larger than one.

Example 46 includes a method comprising generating an indication of a number of demodulation reference signal (DMRS) port groups; generating a plurality of demodulation reference signals (DMRSs) to be transmitted; generating demodulation reference signals to be transmitted on resource elements of a physical downlink shared channel (PDSCH); and transmitting the indication and the DMRS by antenna ports of a DMRS port group of the number of DMRS port groups.

Example 47 includes the method of example 46 or some other example herein, wherein a plurality of DMRS port groups and a plurality of phase tracking reference signal antenna ports are used to transmit the PDSCH and the method further comprises: generating one or more PT-RSs to be transmitted on a first set of resource elements; and puncturing or rate-matching the PDSCH for a second set of resource elements, wherein the second set of resource elements correspond to resource elements used by another TRP to transmit PT-RSs.

Example 48 includes the method of example 47 or some other example herein, further comprising generating downlink control information (DCI) or radio resource control (RRC) signaling to indicate a zero-power PT-RS antenna port.

Example 49 includes the method of example 48 or some other example herein, wherein the method further comprises generating the DCI to indicate the zero-power PT-RS, wherein the DCI includes a PTRS antenna ports indicator field having a value that indicates one or more zero-power PT-RS antenna ports.

Example 50 includes a method comprising reading a transmission configuration indication (TCI) configuration for a physical downlink shared channel (PDSCH) transmission; determining a number of demodulation reference signal (DMRS) port groups based on the TCI configuration; determining a table based on the number of DMRS port groups; and determining a DMRS antenna port index based on the table and an indication in downlink control information (DCI).

Example 51 includes the method of example 50 or some other example herein, further comprising: determining a quasi-co-location (QCL) configuration based on the TCI configuration; and determining the number of DMRS port groups based on the QCL configuration.

Example 52 includes the method of example 50 or some other example herein, further comprising: determining, based on the TCI configuration, a plurality of reference signals having a first QCL type; and determining the number of DMRS port groups is equal to the plurality.

Example 53 includes the method of example 50 or some other example herein, wherein the indication is a value in an antenna port field of the DCI.

Example 54 includes a method comprising determining an association between one or more phase tracking reference signal (PT-RS) antenna ports (APs) and at least one demodulation reference signal (DMRS) port groups; and receiving PT-RS and DMRS based on the association; and demodulating a physical downlink shared channel based on the received PT-RS and DMRS.

Example 55 includes the method of example 54 or some other example herein, wherein the one or more PT-RS APs comprise one PT-RS AP, the at least one DMRS port group comprises one or two DMRS port groups, and determining the association comprises: determining the PT-RS antenna port is associated with a DMRS AP with a lowest index in a codeword with a higher modulation and coding scheme or a codeword 0 if the modulation and coding scheme for both codewords are the same.

Example 56 includes the method of example 54 or some other example herein, wherein the one or more PT-RS APs comprise two PT-RS APs, the at least one DMRS port group comprises one DMRS port group, and determining the association comprises: determining a first PT-RS AP is associated with a DMRS AP with a lowest index in a first codeword and a second PT-RS antenna port is associated with a DMRS AP with a lowest index in a second codeword; or the two PT-RS APs are associated with a first two DMRS APs.

Example 56 includes the method of example 54 or some other example herein, wherein the one or more PT-RS APs comprise two PT-RS APs, the at least one DMRS port group comprises two DMRS port groups, and determining the association comprises: determining a first PT-RS AP is associated with a DMRS AP with a lowest index in a first DMRS port group and a second PT-RS AP is associated with DMRS AP with a lowest index in a second DMRS port group.

Example 57 may include an apparatus comprising means to perform one or more elements of a method described in or related to any of examples 1-56, or any other method or process described herein.

Example 58 may include one or more non-transitory computer-readable media comprising instructions to cause an electronic device, upon execution of the instructions by one or more processors of the electronic device, to perform one or more elements of a method described in or related to any of examples 1-56, or any other method or process described herein.

Example 59 may include an apparatus comprising logic, modules, or circuitry to perform one or more elements of a method described in or related to any of examples 1-56, or any other method or process described herein.

Example 60 may include a method, technique, or process as described in or related to any of examples 1-56, or portions or parts thereof.

Example 61 may include an apparatus comprising: one or more processors and one or more computer readable media comprising instructions that, when executed by the one or more processors, cause the one or more processors to perform the method, techniques, or process as described in or related to any of examples 1-56, or portions thereof.

Example 62 may include a signal as described in or related to any of examples 1-56, or portions or parts thereof.

Example 63 may include a signal in a wireless network as shown and described herein.

Example 64 may include a method of communicating in a wireless network as shown and described herein.

Example 65 may include a system for providing wireless communication as shown and described herein.

Example 66 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause a user equipment (UE) to:
    determine, based on a Transmission Configuration Indication (TCI) configuration, a number of demodulation reference signal (DMRS) port groups for a physical downlink shared channel (PDSCH) transmission based on a number of reference signals for a first quasi-co-location (QCL) type of the TCI configuration, wherein the TCI configuration includes a TCI state containing multiple QCL types including the first QCL type and a second QCL type, and a number of reference signals for the second QCL type is equal to the number of reference signals for the first QCL type, wherein the number of reference signals for the first QCL type and for the second QCL type is greater than one, and wherein the PDSCH transmission is scheduled by a single Downlink Control Information (DCI) that is used to schedule the PDSCH transmission from multiple base stations;
    receive one or more DMRSs via the number of DMRS port groups; and
    demodulate the PDSCH transmission based on reception of the one or more DMRSs.

2. The one or more non-transitory, computer-readable media of claim 1, wherein the instructions, when executed, further cause the UE to:
    determine a number of reference signals for a QCL type of the multiple QCL types; and
    determine the number of DMRS port groups based on the number of reference signals for the QCL type.

3. The one or more non-transitory, computer-readable media of claim 2, wherein the instructions, when executed, further cause the UE to determine the number of reference signals for the QCL type based on the TCI state.

4. The one or more non-transitory, computer-readable media of claim 1, wherein the instructions, when executed, further cause the UE to:
receive DCI that includes a value for a field; and
determine the number of DMRS port groups based on the value.

5. The one or more non-transitory, computer-readable media of claim 1, wherein the instructions, when executed, further cause the UE to:
determine a number of effective DMRS code-division multiplexing (CDM) groups; determine the number of DMRS port groups based on the number of effective DMRS CDM groups; and
determine, based on DCI and one or more tables, a DMRS port index, wherein DMRS port indices in different DMRS port groups are within different DMRS CDM groups.

6. The one or more non-transitory, computer readable media of claim 1, wherein the instructions, when executed, further cause the UE to:
determine a number of phase tracking-reference signal (PT-RS) antenna ports;
receive one or more PT-RSs on the number of PT-RS antenna ports; and
process the PDSCH transmission based on reception of the one or more PT-RSs.

7. The one or more non-transitory, computer-readable media of claim 6, wherein the instructions, when executed, further cause the UE to:
determine the number of PT-RS antenna ports based on the number of DMRS port groups, higher-layer signaling, or DCI.

8. The one or more non-transitory, computer-readable media of claim 1, wherein the instructions, when executed, further cause the UE to:
decode a number of DCI transmissions; and
determine the number of DMRS port groups based on the number of DCI transmissions.

9. The one or more non-transitory, computer-readable media of claim 1, wherein the instructions, when executed, further cause the UE to:
determine configurations for individual DMRS port groups of the number of DMRS port groups, wherein the individual configurations have one or more parameters including scrambling identity, DMRS type, number of front-loaded symbols, position of additional DMRS symbols, or an indication of a presence of a phase tracking reference signal.

10. The one or more non-transitory, computer-readable media of claim 9, wherein a subset or all of the parameters are common to configurations of more than one DMRS port group of the number of DMRS port groups.

11. The one or more non-transitory, computer-readable media of claim 9, wherein the instructions, when executed, further cause the UE to determine a configuration of a DMRS port group based on a transmission configuration indication state to which the DMRS port group is mapped.

12. The one or more non-transitory, computer-readable media of claim 1, wherein the instructions, when executed, further cause the UE to:
determine a mapping between one or more phase tracking-reference signal (PT-RS) antenna ports and at least one DMRS port group, wherein the mapping is a one-to-one, an N-to-one, or a one-to-N mapping, where N is an integer larger than one.

13. A transmission reception point (TRP), the TRP comprising:
processing circuitry to:
generate a Transmission Configuration Indication (TCI) state as an indication of a number of demodulation reference signal (DMRS) port groups, wherein the TCI state contains multiple quasi-co-location (QCL) types including a first QCL type and a second QCL type, and wherein a number of reference signals for the second QCL type is equal to a number of reference signals for the first QCL type, wherein the number of reference signals for the first QCL type and for the second QCL type is greater than one;
generate a plurality of demodulation reference signals (DMRSs) to be transmitted;
generate demodulation reference signals to be transmitted on resource elements of a physical downlink shared channel (PDSCH) scheduled by a single Downlink Control Information (DCI) that is used to schedule the PDSCH from multiple TRPs; and
interface circuitry, coupled with the processing circuitry, to cause transmission of the indication of the number of DMRS port groups and the DMRSs by antenna ports of a DMRS port group of the number of DMRS port groups, wherein the antenna ports of the DMRS port group are determined based on the number of reference signals associated with the first QCL type and the second QCL type.

14. The TRP of claim 13, wherein a plurality of DMRS port groups and a plurality of phase tracking reference signal antenna ports are used to transmit the PDSCH, and the processing circuitry is further to:
generate one or more PT-RSs to be transmitted on a first set of resource elements; and
puncture or rate-match the PDSCH for a second set of resource elements, wherein the second set of resource elements correspond to resource elements used by another TRP to transmit the one or more PT-RSs.

15. The TRP of claim 14, wherein the processing circuitry is further to: generate DCI or radio resource control (RRC) signaling to indicate a zero-power PT-RS antenna port.

16. The TRP of claim 15, wherein the processing circuitry is to generate DCI to indicate the zero-power PT-RS, wherein the DCI includes a PTRS antenna ports indicator field having a value that indicates one or more zero-power PT-RS antenna ports.

17. One or more non-transitory, computer-readable media having instructions that, when executed, cause a device to:
read a transmission configuration indication (TCI) configuration for a physical downlink shared channel (PDSCH) transmission;
determine a number of demodulation reference signal (DMRS) port groups based on a number of reference signals for a first quasi-co-location (QCL) type of the TCI configuration, wherein the TCI configuration includes a TCI state containing multiple QCL (QCL) types including the first QCL type and a second QCL type, and a number of reference signals for the second QCL type is equal to the number of reference signals for the first QCL type, wherein the number of reference signals for the first QCL type and for the second QCL type is greater than one;
determine a table based on the number of DMRS port groups; and
determine a DMRS antenna port index based on the table and an indication in downlink control information (DCI), wherein the DCI is used to schedule the PDSCH transmission from multiple base stations.

18. The one or more non-transitory, computer-readable media of claim 17, wherein the instructions, when executed, further cause the device to:
determine a QCL configuration based on the TCI configuration; and determine the number of DMRS port groups based on the QCL configuration.

19. The one or more non-transitory, computer-readable media of claim 17, wherein the instructions, when executed, further cause the device to:
determine, based on the TCI configuration, a plurality of reference signals having a first QCL type; and
determine the number of DMRS port groups is equal to the plurality of reference signals.

20. The one or more non-transitory, computer-readable media of claim 17, wherein the indication is a value in an antenna port field of the DCI.

21. An apparatus comprising:
means for determining an association between one or more phase tracking reference signal (PT-RS) antenna ports (APs) and at least one demodulation reference signal (DMRS) port groups for a physical downlink shared channel (PDSCH) transmission scheduled by a single Downlink Control Information (DCI) that is used to schedule the PDSCH transmission from multiple base stations, wherein the at least one DMRS port group is determined based on a number of reference signals for a first quasi-co-location (QCL) type of a Transmission Configuration Indication (TCI) state including multiple quasi-co-location (QCL) types including the first QCL type and a second QCL type, and a number of reference signals for the second QCL type is equal to the number of reference signals for the first QCL type, wherein the number of reference signals for the first QCL type and for the second QCL type is greater than one;
means for receiving a PT-RS and a DMRS based on the association; and
means for demodulating a physical downlink shared channel based on the received PT-RS and DMRS.

22. The apparatus of claim 21, wherein the one or more PT-RS APs comprise one PT-RS AP, the at least one DMRS port group comprises one or two DMRS port groups, and the means for determining the association is to: determine the PT-RS antenna port is associated with a DMRS AP with a lowest index in a codeword with a higher modulation and coding scheme or a codeword 0 if the modulation and coding scheme for both codewords are the same.

23. The apparatus of claim 21, wherein the one or more PT-RS APs comprise two PT-RS APs, the at least one DMRS port group comprises one DMRS port group, and the means for determining the association is to:
determine: a first PT-RS AP is associated with a DMRS AP with a lowest index in a first codeword and a second PT-RS antenna port is associated with a DMRS AP with a lowest index in a second codeword; or
the two PT-RS APs are associated with a first two DMRS APs.

24. The apparatus of claim 21, wherein the one or more PT-RS APs comprise two PT-RS APs, the at least one DMRS port group comprises two DMRS port groups, and the means for determining the association is to:
determine a first PT-RS AP is associated with a first DMRS AP with a lowest index in a first DMRS port group and a second PT-RS AP is associated with a second DMRS AP with a lowest index in a second DMRS port group.

* * * * *